United States Patent [19]
Sakuma et al.

[11] 3,969,193
[45] July 13, 1976

[54] METHOD FOR PREVENTING SCALE IN SALINE WATER DESALTING APPARATUS AND SALINE WATER RECLAMATION APPARATUS FOR CARRYING OUT SAID METHOD

[75] Inventors: Junichi Sakuma; Shigeo Takahashi, both of Yokohama, Japan

[73] Assignee: Ishikawajima-Harima Jukogyo Kabushiki Kaisha, Tokyo, Japan

[22] Filed: Jan. 6, 1971

[21] Appl. No.: 104,392

[30] Foreign Application Priority Data
July 11, 1970   Japan.................................. 45-60766

[52] U.S. Cl. ....................................... 203/7; 203/3; 203/11; 203/34; 202/160; 202/173
[51] Int. Cl.² ......................................... C23F 14/00
[58] Field of Search ....................... 203/7, 3, 34, 35; 202/173, 160

[56] References Cited
UNITED STATES PATENTS

| | | | |
|---|---|---|---|
| 2,733,196 | 1/1956 | Hillier et al. ............................ | 203/7 |
| 3,000,795 | 9/1961 | Goeldner ................................ | 203/7 |
| 3,218,241 | 11/1965 | Checkovich ........................... | 203/7 |
| 3,476,654 | 11/1969 | Sleder..................................... | 203/7 |

*Primary Examiner*—Wilbur L. Bascomb, Jr.
*Attorney, Agent, or Firm*—Nolte and Nolte

[57] ABSTRACT

A scale removal method for use in saline water desalting apparatus characterized in that, during the time the desalting operation is being performed, an acid is added to the saline water for short periods at predetermined time intervals in the salt water passages for condensation, heating and heat recovery.

5 Claims, 1 Drawing Figure

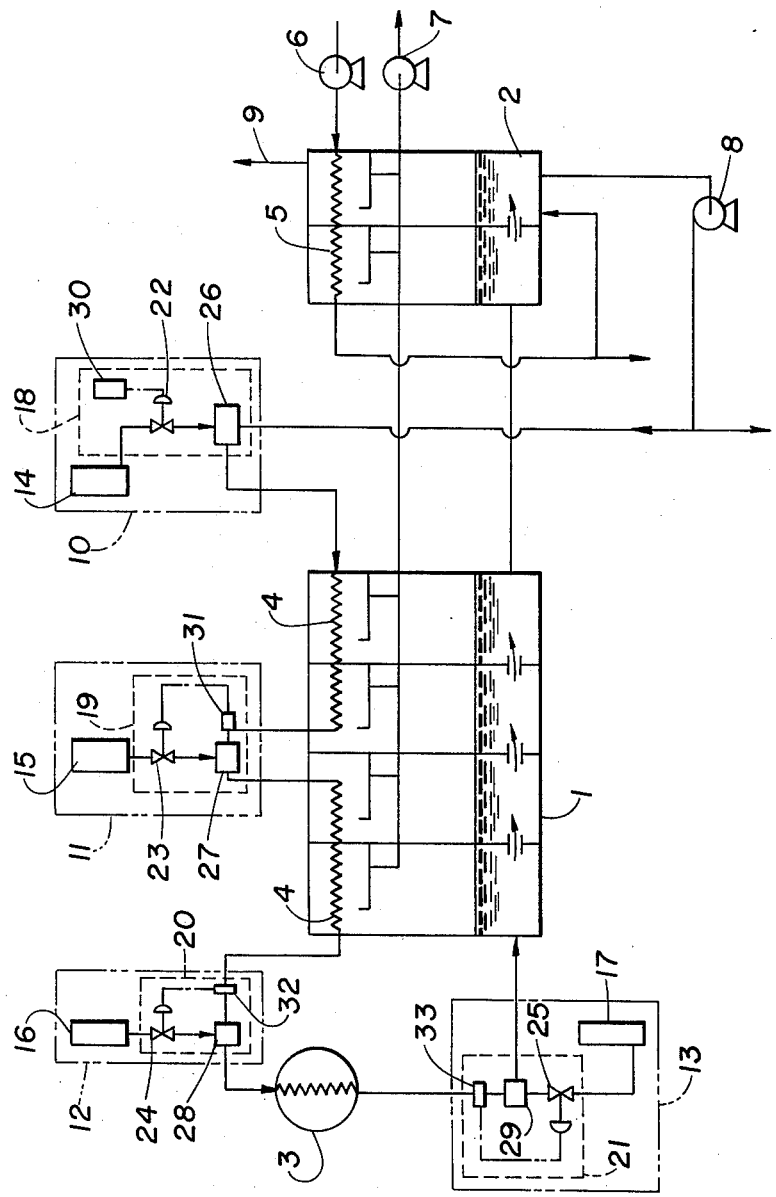

METHOD FOR PREVENTING SCALE IN SALINE WATER DESALTING APPARATUS AND SALINE WATER RECLAMATION APPARATUS FOR CARRYING OUT SAID METHOD

DETAILED EXPLANATION OF THE INVENTION

The present invention relates to a scale prevention method for use in saline water desalting and a saline water desalting apparatus adapted to carry out said method.

In general, scale prevention methods for use in flash distillation type saline water desalting apparatus are of two types, one being the method of adding a scale prevention agent into saline water to be evaporated and the other being the method of removing carbonic ions in saline water as a pre-treatment. Both of the methods are unsatisfactory in operation and are uneconomical.

In the method in which adding a scale prevention agent (mainly consisting of polymerized phosphates) is added to the saline water, the properties of the saline water adversely affect the scale prevention effect. Furthermore, the continuous addition of the agent will increase the operation cost. In the method of continuously charging an acid into saline water to remove the carbonic ions in saline water in the form of carbon dioxide, etc., a relatively large-sized de-gassing column must be provided. Furthermore since the hydrogen ion concentration in saline water is increased, the problem of corrosion of various parts in contact with saline water arises. The costs of agents for preventing the corrosion are also a problem in this method.

In brief, the present invention provides a method for use in a flash distillation apparatus for saline water desalting comprising the step of removing the scale formed from saline water and accumulated upon the heating surfaces of the apparatus before the remarkable growth of the scale starts. The method of the present invention may be carried out economically by simple means. In accordance with the present invention, during the time the desalting operation is being performed, an acid is added to the saline water for short periods at predetermined time intervals immediately before entering and/or in the course of the condensation and heating passages of the whole system of the condensation, heating and heat-recovery passage for saline water. The periodically introduced acid thereby repetitively dissolves and removes alkali scale formed upon the heating surfaces in said apparatus at the stage at which very fine nuclei of scale are formed.

The present invention will be described in more detail hereinafter with reference to the accompanying drawing.

The FIGURE is a diagrammatic view illustrating a multiple-stage flash distillation apparatus for saline water desalting employing the method of the present invention.

Referring now to the drawings, a saline water re-circulation type multiple-stage flash distillation system for desalting saline water in accordance with the invention comprises a heat recovery unit 1, a heat rejection unit 2, a heater 3, condensers 4 and 5, pumps 6, 7 and 8, a vacuum line 9 and scale prevention agent charging devices 10, 11, 12 and 13. The heat recovery unit 1 and the heat rejection unit 2 each include a plurality of stages, as indicated by the partitions in these units, and in the following description the order of the stages proceeds from the left side of the drawing to the right so that, for example, the first stage of the heat recovery unit 1 is the leftmost stage of this unit. The charging device comprise agent storage tanks 14, 15, 16 and 17 respectively and agent charging control units 18, 19, 20 and 21 respectively. The control unit 18 comprises a valve 22, a mixer 26 and a valve opening control unit 30. The control units 19, 20 and 21 comprise mixers 27, 28 and 29 respectively and hydrogen ion concentration detectors 31, 32 and 33 respectively for controlling the openings of the valves.

Saline water is forced into the system by the pump 6, the water initially flowing through condenser 5 so that vapor evolved by flashing in the heat rejection unit 2 condensers on the outer surface of the condenser 5. The saline water flowing through the condenser 5 is heated therein and is then discharged from the condenser 5. A portion of saline water is discarded and the remaining portion is introduced in the last flash stage in the heat rejection unit 2. The saline water in this stage is pumped to the condenser 4 of the last stage of the heat recovery unit 1 of the multiple-stage flash type by the pump 8. Saline water is then made to flow back through the stages in the condenser 4, and then flows into the heater 3 from the condenser 4 of the first stage of the heat recovery unit 1. In the heater 3, the saline water is heated and is forced into the first flash stage in the heat recovery unit 1. The pressures in the flash stages in the heat recovery unit 1 are successively lowered so that the successive flashing of saline water may be accomplished when saline water flows from the first to the last flashing stage. Saline water from the last flash stage in the heat recovery unit 1 is forced into the flash stage in the heat rejection unit 2 so that saline water may be vaporized further, mixed with the saline water from the condenser 5, and then discharged out of the flash stage in the heat rejection unit 2. Saline water is recycled in a manner described above.

In the system of the type described above, the scale is accumulated upon the heating surfaces of the condenser 4 and the heater 3. According to the scale prevention method of the present invention, an acid is periodically charged into saline water from the agent charging device 10 for short periods at a predetermined time interval before the saline water passes into the condenser 4, so that the hydrogen ion concentration of saline water flowing through the condenser 4 and the heater 3 may be periodically temporarily increased. After passing through the heater 3, saline water is repetitively flashed through the system as described above. If required, a neutralization agent may be added intermittently from the device 13 to the saline water passing between the heater 3 and the flash stage or chamber in the heat recovery unit 1 so that the hydrogen ion concentration increased by the addition of the acid may be lowered before saline water is introduced into the flash chamber.

Since the temperature of the saline water increased as it approaches the heater 3, scale formation also increases. To overcome this problem, it is more advantageous to charge the acid in several positions between the inlet of the condenser 4 and the outlet of the heater 3. In the relatively low temperature zone between the inlet and center of the condenser 4, the scale formation may be prevented without increasing the hydrogen ion concentration higher than in the high temperature zone. However, in the high temperature zone including the heater 3, the hydrogen ion concentration must be maintained at a high value. However, assuming the acid is added to the saline water only from the charging device 10, the hydrogen ion concentration in the low temperature zone is maintained at a value higher than a required concentration, and is decreased in the high temperature zone where the high ion concentration must be maintained. In consequence, the scale formation cannot be satisfactorily prevented especially in the high temperature zone.

The agent charging devices 11 and 12 are provided for charging the acid to saline water in two spaced apart positions between the inlet of the condenser 4 and the outlet of the heater 3. A suitable amount of acid is first added from the charging device 10 so that the saline water having a suitable acid concentration may flow through the low temperature condenser pipe and additional acid is charged into the saline water from the device 11 before saline water starts to flow through the high temperature zones. In this case, the scale prevention effect increases when the waveform of the acid concentration in saline water mixed with the acid coincides with that in saline water mixed with acid in later stages so that the peak of the acid concentration increases.

Additional acid may be charged from the device 12 to the saline water between the condenser 4 and the heater 3 so as to further prevent the scale formation upon the heating surfaces of the heater 3.

In order to control the time of charging the acid in the saline water so that the peaks of the acid concentration waveforms from the various charging devices coincide with each other, the acid may be added from the devices 11 and 12 after a time interval required for the acid added from the device 10 to reach the devices 11 and 12. However, this method is not satisfactory because the time lag varies with variation in the flow rate of saline water in the condenser 4. To overcome this problem, the hydrogen ion concentration in the upper stream of each of the devices 11 and 12 is detected so as to control the timing of charging the acid to saline water. In this method, the peaks of the ion concentration waveforms may be controlled to correctly coincide with each other in a simple manner. This method may also be employed to control charging the neutralization agent from the device 13.

The hydrogen ion concentration detectors 31, 32 and 33 are provided for carrying out this method so as to ensure that the peaks of the ion concentration waveforms coincide.

In the scale prevention method in accordance with the present invention, the number of charges of the acid added to the saline water, the hydrogen ion concentration of the circulating saline water and the time interval for maintaining the desired hydrogen ion concentration must be determined based upon their interrelation. It is not necessary to maintain the circulating saline water at a value less than pH 1.7 because of the corrosion of the devices and equipment. However, when the pH is higher than 3 the scale prevention effect is not satisfactory. Therefore the preferred pH is between 1.7 and 3.0.

Experiments were conducted in order to investigate the relation between the scale formation time and the number of additions or charges of acid in case of the scale formation upon the heating surfaces of the tubes of the condensers and heater. No scale formation was observed three and five hours after the operation of the heat-exchanger so that one to five acid additions every ten hours are sufficient for scale prevention. When the number of additions is increased, the problem of corrosion arises. Furthermore, when the time interval at which the pH of the saline water may be maintained in the above pH range by the addition of acid is less than 10 seconds, the reaction time is too short to attain the satisfactory scale prevention effect. However, when the time interval is increased to longer than 50 seconds, the problem of corrosion also arises.

The present invention has been described so far as being applied to the saline water recirculating type multipe-stage flash distillation system for saline water desalting, it may be also applied to other multiple-stage flash distillation and flash distillation of the type in which saline water is not recirculated.

From the foregoing description, it is seen that the present invention is based upon the observed fact that in a flash type saline water desalting system there is a time lag between the time scale is formed and accumulated upon the heating surface and the time the remarkable scale growth is started. Therefore the acid need not be added continuously. According to the present invention, small quantities of the acid are added periodically so that the total amount of acid to be added may be reduced to one-tenths as compared with the prior art scale prevention method.

Even when the amount of acid to be added may vary, the charging time is very short so that the problem of corrosion will not occur. To carry out the present invention, the only additional devices which are required are those devices which periodically charge the acid to saline water. Large-sized de-gassing devices which are required in the prior art system of adding acid continuously are not required. Thus, the installation cost may advantageously be greatly reduced.

We claim:

1. A method for preventing the formation of scale during the operation of a saline water desalting apparatus of the type in which saline water is passed through a system of condenser and heater passages having heating surfaces, said method comprising periodically charging said saline water with an acid at predetermined time intervals, and thereafter passing the charged saline water into said system of passages at a point intermediate the ends of the passages, whereby alkali scale formed upon said heating surfaces is periodically dissolved and removed at a stage at which very fine nuclei of scale are being formed.

2. The method of claim 1 wherein said step of periodically charging said saline water comprises adding said acid to said saline water at a rate of from 1 to 5 times every ten hours for periods of from 10 to 50 seconds for maintaining the pH of the saline water at said point during said periods within the range of 1.7 to 3.0

3. A method for preventing the formation of scale during the operation of a saline water desalting apparatus of the type in which saline water is passed through a system of condenser and heater passages having heating surfaces, said method comprising periodically charging said saline water with an acid at predetermined time intervals, and substantially immediately thereafter passing the charged saline water into said system of passages, said periodic charging comprising adding said acid to said saline water at a rate of from 1 to 5 times every ten hours with each period of adding said acid being for a time of from 10 to 50 seconds to maintain the pH of the saline water within a range of from 1.7 to 3.0 during each said period, whereby alkali scale formed upon said heating surfaces is periodically dissolved and removed at a stage at which very fine nuclei of scale are being formed.

4. A method for preventing the formation of scale during the operation of a saline water desalting apparatus of the type in which saline water is passed through a system of condenser and heater passages having heating surfaces, said method comprising periodically charging saline water with an acid at predetermined time intervals, and introducing the saline water charged with acid to a plurality of points in said system, said step of charging said saline water comprising adding said acid to saline water at a rate of from 1 to 5 times every ten hours with each period of adding acid being from 10 to 50 seconds for maintaining the pH of the portion of the saline water at the respective point of the system within a range of from 1.7 to 3.0, whereby alkali scale formed upon said heating surfaces is periodically dissolved and removed at a stage at which very fine nuclei of scale are being formed.

5. In a multiple stage flash distillation apparatus for desalting saline water of the type having saline water passages extending from an inlet serially through condenser passages to the inlet of a heater, the improvement comprising means for periodically charging acid to said saline water at said inlet, means for detecting the pH of saline water flowing through said passages at a point downstream of said inlet, and means responsive to the detection of the pH of the saline water at said point for charging an acid to the saline water at said point only at the peaks of acid concentration flowing by said point.

* * * * *